United States Patent
Kohara et al.

(10) Patent No.: US 6,482,349 B1
(45) Date of Patent: Nov. 19, 2002

(54) POWDER PRESSING APPARATUS AND POWDER PRESSING METHOD

(75) Inventors: Seiichi Kohara, Mishima-gun (JP); Tsutomu Harada, Settsu (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/421,237

(22) Filed: Oct. 20, 1999

(30) Foreign Application Priority Data

Nov. 2, 1998 (JP) ............................... 10-311938

(51) Int. Cl.$^7$ .................. B29C 43/36; B30B 11/00
(52) U.S. Cl. ............... 264/517; 264/109; 264/338; 425/90; 425/107; 425/352
(58) Field of Search ................ 264/517, 101, 264/102, 109, 130, 338; 425/78, 100, 107, 345, 344, 352, 353, 354, 355, 90; 427/110, 133, 182

(56) References Cited

U.S. PATENT DOCUMENTS

| 2,026,940 A | | 1/1936 | Hendryx |
| 3,132,379 A | | 5/1964 | Crane |
| 4,323,530 A | | 4/1982 | Voss et al. |
| 5,085,828 A | | 2/1992 | Shain et al. ............... 419/66 |
| 5,643,630 A | * | 7/1997 | Hinzpeter et al. ............ 425/353 |
| 6,079,968 A | * | 6/2000 | Schmitz et al. ............. 425/345 |

FOREIGN PATENT DOCUMENTS

| DE | 2 061 874 | 6/1971 |
| DE | 197 43 704 | 8/1999 |
| JP | 56-14098 | 2/1981 |
| JP | 62-105795 | 7/1987 |
| JP | 62-146597 | 9/1987 |
| JP | 2-117799 | 5/1990 |
| JP | 2-38078 | 8/1990 |
| JP | 3-291307 | 12/1991 |
| JP | 5-156307 | 6/1993 |
| JP | 7-26094 | 5/1995 |
| JP | 7-124231 | 5/1995 |
| JP | 8-10993 | 1/1996 |
| JP | 9-104902 | 4/1997 |

OTHER PUBLICATIONS

Patent Abstract of Japan vol. 015, No. 126(C–0817), Mar. 27, 1991 (1991–03–27) & JP 03 009757 A (Tsumura & Co), Jan. 17, 1991 (1991–01–17). *abstract*.
Patent Abstract of Japan vol. 018, No. 514 (M–1680), Sep. 28, 1994 (1994–09–28) & 06 179098 A (Kao Corp), Jun. 28, 1994 (1994–06–28). *abstract*.
Patent Abstract of Japan vol. 011, No. 180 (M–597), Jun. 10, 1987 (1987–06–10) & JP 62 009798 A (Fuji Electrochem Co. Ltd), Jan. 17, 1987 (1987–01–17). *abstract*.
Patent Abstractof Japan vol. 016, No. 129 (M–1228), Apr. 2, 1992 (1992–04–02) & JP 03 291307 A (NKK Corp), Dec. 20, 1991. *abstract*.
Notification of Reasons for Refusal to the corresponding Japanese Patent Application No. 11-312203 (and translation thereof.) Dispatch No. 354343.
Japanese Utility Model Publication (of examined application for opposition) No. 37–21508.

\* cited by examiner

*Primary Examiner*—Mathieu D. Vargot
(74) *Attorney, Agent, or Firm*—Armstrong, Westerman & Hattori, LLP

(57) ABSTRACT

A powder pressing apparatus comprises an upper punch and a lower punch for compression of a powder in a cavity formed in a through hole of a die. A gap between a side surface of the lower punch and a side surface of the through hole of the die is sealed by a sealing member. A lubricant is supplied with a gas from a nozzle in the side surface of the lower punch to the side surface of the through hole, and the lubricant applied to the side surface of the through hole is spread by an absorbing member. The cavity is filled with the powder while the cavity is under suction by a reduced pressure provided from the nozzle in the side surface of the lower punch. During the suction, a filtering member provides filtration for the lower punch not to draw the powder in.

23 Claims, 7 Drawing Sheets

POWDER PRESSING APPARATUS AND POWDER PRESSING METHOD

BACKGROUND OF THE INVENTION

1. Field of the Invention

The present invention relates to a powder pressing apparatus and a powder pressing method, and more specifically to a powder pressing apparatus and a powder pressing method for formation of a green compact by compressing a rare-earth magnetic powder filled in a cavity.

2. Description of the Related Art

Generally, a rare-earth magnetic powder pressing apparatus of the above kind comprises a die having a vertical through hole, an upper punch to be inserted from above the through hole of the die, and a lower punch inserted into the through hole of the die for sliding movement relative to the die. The lower punch provides a cavity within the through hole of the die. The cavity is filled with the rare-earth magnetic powder gravitationally supplied from above and then, the upper punch is inserted into the through hole so that the rare-earth magnetic powder is pressed by the upper punch and the lower punch into a compact.

According to the above pressing apparatus, generally, a lubricant (mold releasing agent) is applied to a side surface of the through hole for prevention of seizure of the side surface of the through hole as well as for ease of removing the compact out of the through hole. For this particular operation, there is an apparatus disclosed in Japanese Patent Laid-Open No. 3-291307, in which a nozzle is provided on a side surface of the lower punch. According to this apparatus, while the die is moving relative to the lower punch, the lubricant is supplied to the side surface of the through hole directly from the nozzle, thereby improving operating efficiency of the apparatus.

On the other hand, Japanese Utility Model Laid-Open 62-146597 discloses an apparatus in which a suction port is provided in the side surface of the through hole of the die or in a lower surface of the upper punch. When the powder is pressed into the compact, air and other gases within the cavity are sucked (deaerated), thereby decreasing the amount of the gases captured in the compact.

There are problems, however. According to the former disclosure (Japanese Patent Laid-Open No. 3-291307), although the lubricant can be applied reliably to a region of the side surface of the through hole of the die near the nozzle, it is difficult to make the application uniformly to the entire side surface of the through hole. As a result, it becomes difficult to reliably remove the compact from the through hole. If the application is to be made uniformly, on the other hand, then a large amount of the lubricant must be supplied, so that the compact is coated with an unnecessary amount of the lubricant. The excess amount of the lubricant will make a surface of the compact brittle, and therefore susceptible to a cracking or a flaking defect. Further, if the former conventional apparatus is used to press the rare-earth magnetic powder, the lubricant, which is an organic compound, is likely to increase carbon content of the compound after sintering, deteriorating magnetic characteristics of a rare-earth magnet. Furthermore the green compact comprised of the powder manufactured by a strip casting process has a poorer compact strength due to a sharp distribution curve of grain sizes.

According to the above pressing apparatus, the cavity is filled with the rare-earth pressing magnetic powder gravitationally supplied from above. This often causes the powder to be filled non-uniformly, particularly at a corner portion formed by the side surface of the through hole of the die and the lower punch. This problem is especially serious if the powder being used is manufactured by a strip casting process, because the powder made by the strip casting process has a much poorer fluidity than a mold casting process, characterized by a sharp distribution curve of grain sizes. Thus, an attempt may be made to apply the latter apparatus (Japanese Utility Model Laid-Open No. 62-146597) for making suction from the side surface of the through hole of the die while the powder is being filled into the cavity.

However, although the provision of a suction port in the side surface of the through hole of the die makes it possible to deaerate, it is difficult to form a large number of suction ports uniformly. Further, even if the suction is performed from the side surface of the through hole of the die, it is still difficult to improve uniformity of the powder filling, particularly at the corner portion formed by the lower punch and the side surface of the through hole of the die. Therefore, improvement is not achieved in quality or yield of the compact. As a result, improvement is not achieved in productivity, either.

SUMMARY OF THE INVENTION

It is therefore a primary object of the present invention to provide a powder pressing apparatus and a powder pressing method capable of improving the quality and yield of the compact, thereby improving the productivity.

According to an aspect of the present invention, there is provided a powder pressing apparatus for formation of a compact by pressing a powder, comprising: a die having a vertical through hole; a first punch and a second punch, each being vertically movable within the through hole relative to the die, for compression of the powder within a cavity formed in the through hole; and a supplying means including a supply port provided in a side surface of the first punch, for supply of a lubricant with a gas from the supply port to the side surface of the through hole within the through hole.

According to another aspect of the present invention, there is provided a method of pressing a powder for formation of a compact through. compression of the powder by a first punch and a second punch within a cavity formed in a vertical through hole of a die, comprising: a lubricant supplying step of supplying a lubricant with a gas from a side surface of the first punch to a side surface of the through hole within the through hole; a powder filling step of filling the cavity with the powder; and a press forming step of forming the compact by pressing the powder filled in the cavity by the first punch and the second punch.

According to the present invention, a lubricant with a gas is supplied in la form of a spray or mist for example, from a side surface of the first punch to a side surface of the through hole of the die. Therefore, the lubricant can be applied easily and uniformly to the side surface of the through hole of the die, applying only a relatively small amount of the lubricant. As a result, the compact can be reliably taken out of the through hole. Further, magnetic characteristics of a magnet obtained by sintering the compact can be improved since carbon content of the resulting magnet is small. As a result, it becomes possible to improve the quality and yield of the compact, thereby improving the productivity.

According to the present invention, preferably, the lubricant applied to the side surface of the through hole is spread by an absorbing member, for example. This makes it possible to apply the lubricant even more uniformly on the side surface of the through hole, making it possible to provide more saving of the amount of application.

Further, preferably, the first punch is formed to have a polyangular section so as to have an angular portion, and the lubricant is supplied from inside the first punch through near the angled portion to the side surface of the through hole. If the first punch is formed to have a polyangular section, a corner portion of the through hole corresponding to the angled portion becomes susceptible to non-uniform application. However, by supplying the lubricant from near the angled portion of the first punch, it becomes possible to reliably apply the lubricant to the corner portion of the through hole. As a result, the compact can be reliably taken out of the through hole of the die even if the first punch has the polyangular section, making it possible to improve further the quality and yield of the compact, thereby improving the productivity, as well as expanding the life of the metal molds.

Further, preferably, the lubricant is supplied to the side surface of the through hole, while a gap between the side surface of the first punch and the side surface of the through hole is sealed by a sealing portion for example provided in the side surface of the first punch farther away from the cavity than is the supply port. If the first punch is a lower punch, the lubricant is reliably discharged upward by the sealing provided at the lower portion of the supply port. As a result, a body of powder captured between the side surface of the lower punch and the side surface of the through hole of the die can be removed by the upward blast provided by the lubricant with gas. Therefore, it becomes possible to reduce wear on the side surface of the lower punch and the side surface of the through hole of the die caused by the powder. This advantage becomes especially significant if the powder contains a highly abrasive rare-earth magnetic powder. Further, the applied lubricant can be prevented from flowing downward. On the other hand, if the first punch is an upper punch, the lubricant can be reliably discharged downward by sealing an upper portion of the supply port, and the applied lubricant can be preventing from leaking through a gap between the upper punch and the side surface of the through hole to the upper surface of the die and so on.

Further, preferably, the first punch is the lower punch. As described above, according to the present invention, the lubricant can be applied easily and uniformly to the side surface of the through hole of the die, by using a relatively small amount of the lubricant. As a result, there is a very rare possibility for the lubricant to pool on the upper surface of the lower punch. Thus, the powder is easily set into form when pressed, and therefore the compact having desired characteristics can be obtained. Even if the lower punch has the upper surface formed into a recess, there is still a very rare possibility for the lubricant to pool on the upper surface of the lower punch, and therefore the same advantage is achieved.

Further, preferably, the powder contains a rare-earth magnetic powder. According to the present invention, application of an unnecessarily large amount of the lubricant to the compact can be prevented. Thus, even if the compact is formed from the powder containing the rare-earth magnetic powder, and if this compact is sintered, a resulting rare-earth magnet has a low carbon content. As a result, magnetic characteristics of the rare-earth magnet can be improved.

According to another aspect of the present invention, there is provided a powder pressing apparatus for formation of a compact by pressing a powder, comprising: a die having a vertical through hole; an upper punch and a lower punch, each being vertically movable within the through hole relative to the die, for compression of the powder within a cavity formed in the through hole; and a sucking means including a suction port provided in a side surface of the lower punch, for providing suction from the cavity under a reduced pressure from the suction port while the cavity is being filled with the powder.

According to still another aspect of the present invention, there is provided a method of pressing a powder for formation of a compact through compression of the powder by an upper punch and a lower punch within a cavity formed in a vertical through hole of a die, comprising: a powder filling step of filling the cavity with the powder while the cavity is under suction by a reduced pressure provided from a side surface of the lower punch; and a press forming step of forming the compact by pressing the powder filled in the cavity by the upper punch and the lower punch.

According to the present invention, the cavity is filled with the powder while the cavity is under suction by a reduced pressure provided from the side surface of the lower punch. Thus, the powder can be reliably filled even to the corner portion formed by the side surface of the through hole of the die and the lower punch, making it possible to prevent non-uniform filling of the powder in the cavity. Thus, it becomes possible to improve the quality and yield of the compact, thereby improving the productivity.

According to the present invention, preferably, filtration is provided by a filtering member provided in the side surface of the lower punch for covering the sucking port for example, during the suction from the cavity by a reduced pressure for preventing the lower punch from sucking the powder. This prevents clogging of the suction port, making possible to provide the suction reliably and uniformly.

Further, preferably, the lower punch is formed to have a polyangular portion so as to have an angled portion, and the cavity is sucked by a reduced pressure provided from near the angled portion. If the lower punch is formed to have a polyangular section, a corner portion of the through hole corresponding to the angled portion becomes susceptible to non-uniform filling. However, through providing the suction of the cavity by the reduced pressure from near the angled portion of the lower punch, such a corner portion can also be filled reliably with the powder, making it possible to prevent non-uniform filling reliably. As a result, it becomes possible to further improve the quality and yield of the compact, thereby improving the productivity.

Still further, preferably, the gap between the side surface of the lower punch and the side surface of the through hole of the die is sealed by a sealing portion provided in the side surface for the lower punch below the section port for example, while the cavity is under the suction provided by the reduced pressure. This makes it possible to generate a partial vacuum above the lower punch while the cavity is under suction, thereby improving the effect of the suction.

As has been described here above, non-uniform filling of the powder within the cavity is prevented. Thus, even if the powder includes a rare-earth magnetic powder having a poor fluidity, it becomes possible to fill the corner portion of the through hole with the powder, making it possible to form the compact of good quality. Therefore, the present invention is effective if the powder includes the rare-earth magnetic powder. The present invention is specially effective if the rare-earth magnetic powder is manufactured by a strip casting process, thus having a poor fluidity.

According to another aspect of the present invention, there is provided a powder pressing apparatus for formation of a compact by pressing a powder, comprising: a die having a vertical through hole; a first punch and a second punch, each being vertically movable within the through hole relative to the die, for compression of the powder within a cavity formed in the through hole; a lubricant holding means provided in a side surface of the first punch, for application of a lubricant to a side surface of the through hole in contact with the side surface of the through hole; and a lubricant supplying means for supply of the lubricant to the lubricant holding means.

According to still another aspect of the present invention, there is provided a method of pressing a powder for formation of a compact through compression of the powder by a first punch and a second punch within a cavity formed in a vertical through hole of a die, comprising: a lubricant supplying step of supplying a lubricant to a side surface of the through hole by bringing a lubricant holding means holding the lubricant into contact with the side surface of the through hole; a powder filling step of filling the cavity with the powder; and a press forming step of forming the compact by pressing the powder filled in the cavity by the first punch and the second punch.

According to the present invention, the lubricant can be applied easily and uniformly to the side surface of the through hole of the die, applying only a relatively small amount of the lubricant. As a result, the compact can be reliably taken out of the through hole. Further, magnetic characteristics of a magnet obtained by sintering the compact can be improved since carbon content of the resulting magnet is small. As a result, it becomes possible to improve the quality and yield of the compact, thereby improving the productivity.

Further, preferably, the powder contains a rare-earth magnetic powder. According to the present invention, application of an unnecessarily large amount of the lubricant to the compact can be prevented. Thus, even if the compact is formed from the powder containing the rare-earth magnetic powder, and if this compact is sintered, a resulting rare-earth magnet has a low carbon content. As a result, magnetic characteristics of the rare-earth magnet can be improved.

The above described objects and other objects, features, aspects and advantages of the present invention will become more apparent from the following detailed description of embodiments when taken in conjunction with the accompanying drawings.

DETAILED DESCRIPTION OF THE PREFERRED EMBODIMENTS

An embodiment of the present invention will be described here below with reference to the attached drawings.

Figure 1:
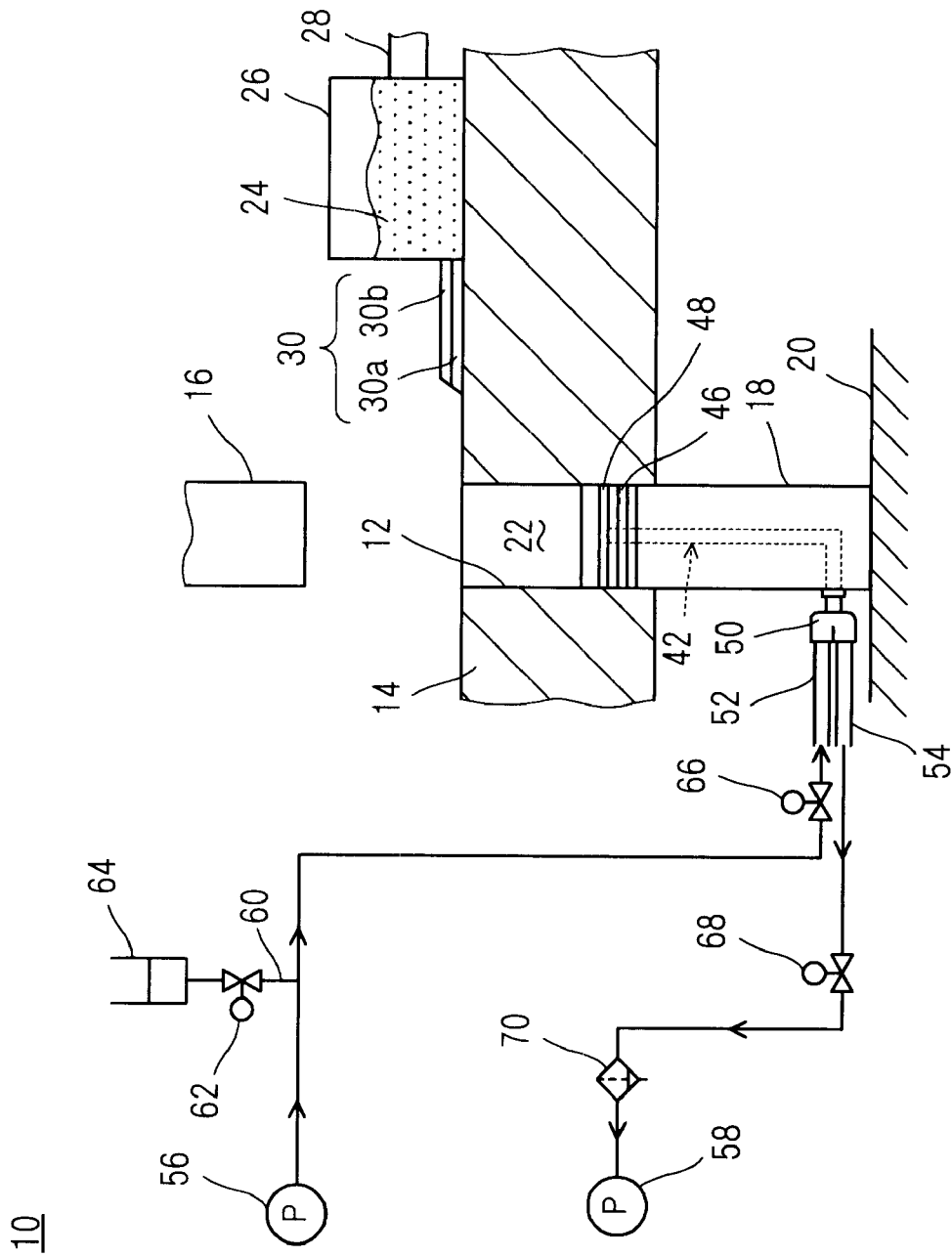
FIG. 1 is a schematic diagram of a rare-earth magnetic powder pressing apparatus as an embodiment of the present invention.

Referring now to FIG. 1, a rare-earth magnetic powder pressing apparatus 10 as an embodiment of the present invention comprises a die 14 provided with a vertical through hole 12 having a rectangular section, an upper punch 16 for insertion into the through hole 12 of the die 14 from above, and a lower punch 18 inserted in the through hole 12 of the die 14. The lower punch 18 is fixed to a main body 20 of the pressing apparatus. On the other hand, the die 14 is movable in vertical reciprocation by an unillustrated electric motor or cylinder for example, so that the lower punch 18 is vertically movable relative to the die 14. As shown in FIG. 1, when the die 14 is raised relative to the lower punch 18, a cavity 22 is formed by the lower punch 18 in the through hole 12 of the die 14.

The die 14 has an upper face provided with a feeder box 26 loaded with powder 24 made of a rare-earth magnetic powder for example. The feeder box 26 is attached with an arm 28 extending horizontally, and a wiper 30 contacting the upper surface of the die 14. The arm 28 is connected to an unillustrate delectric motor or cylinder for example. Such an electric motor or cylinder slides the feeder box 26 on the upper surface of the die 14 in left and right directions as in FIG. 1. On the other hand, the wiper 30 includes a felt 30a and a rubber plate 30b. The rubber plate 30b is fixed on the felt 30a for supporting the felt 30a. When the feeder box 26 is sliding on the upper surface of the die 14, the felt 30a wipes the powder 24 blown out of the through hole 12 onto the upper surface of the die 14 as will be detailed later.

The powder 24 in the feeder box 26 contacts the upper surface of the die 14. When the feeder box 26 comes above the cavity 22, the powder 24 in the feeder box 26 falls to fill the cavity 22. The powder 24 thus filled in the cavity 22, is then pressed by the upper punch 16 inserted into the through hole 12 (the cavity 22) and the lower punch 18.

Figure 2:
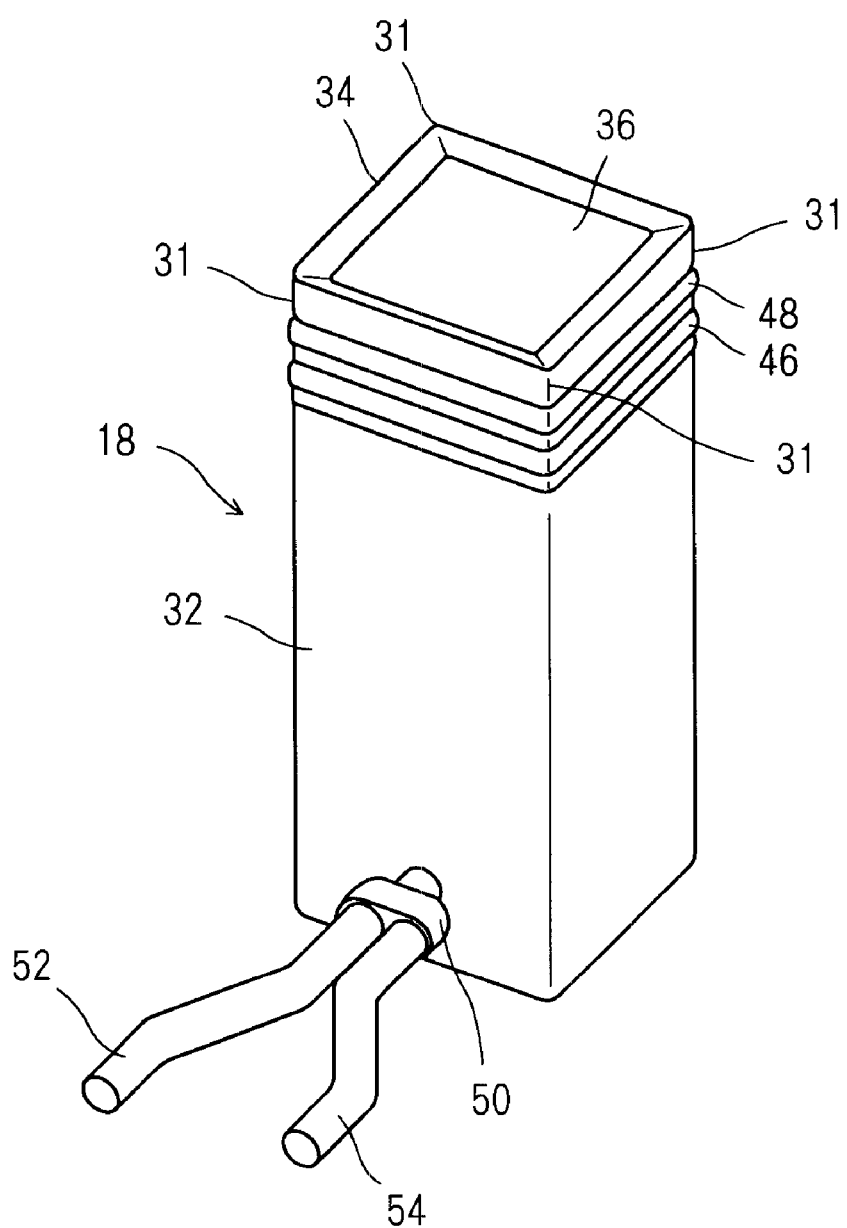
FIG. 2 is a perspective view showing a lower punch.
Figure 3:
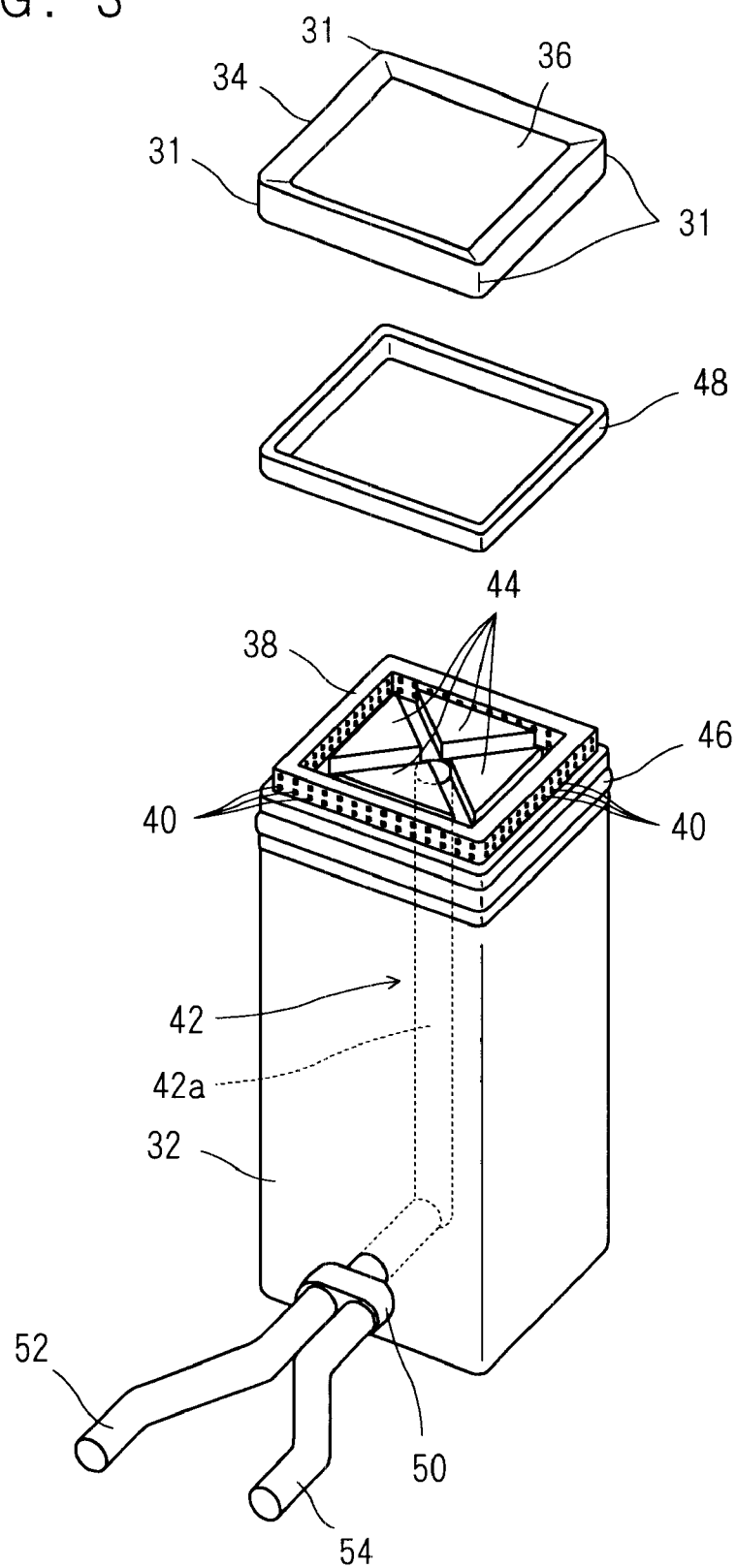
FIG. 3 is an exploded perspective view showing an internal constitution of the lower punch.

As shown in FIGS. 2 and 3, the lower punch 18 is formed in correspondence with the through hole 12 of the die 14, into a form having a rectangular (polyangular) section and angled portions 31. The lower punch 18 includes a lower punch main body 32 and a lid member 34. The lid member 34 has an upper surface serving as an upper surface of the lower punch 18, formed with a recess 36. The recess 36 is provided with a mirror polish for example so that a compact 72 (to be described later) can be separated easily from the lower punch 18. The lower punch main body 32 has an upper surface machined into a ring portion 38. The ring portion 38 has a side surface formed with a multiplicity of through holes as supply ports, i.e. nozzles 40. The nozzles 40 are formed in rows circumferentially as well as vertically of the ring portion 38 so as to supply a lubricant generally uniformly over the entire circumference of a side surface of the through hole 12 of the die 14. With this arrangement, the multiplicity of the nozzles 40 capable of spraying the lubricant to the side surface of the through hole 12 of the die 14 from within the lower punch 18 is provided circumferentially of the side surface of the lower punch 18 at a portion closer to an upper end of the lower punch 18.

Figure 4:
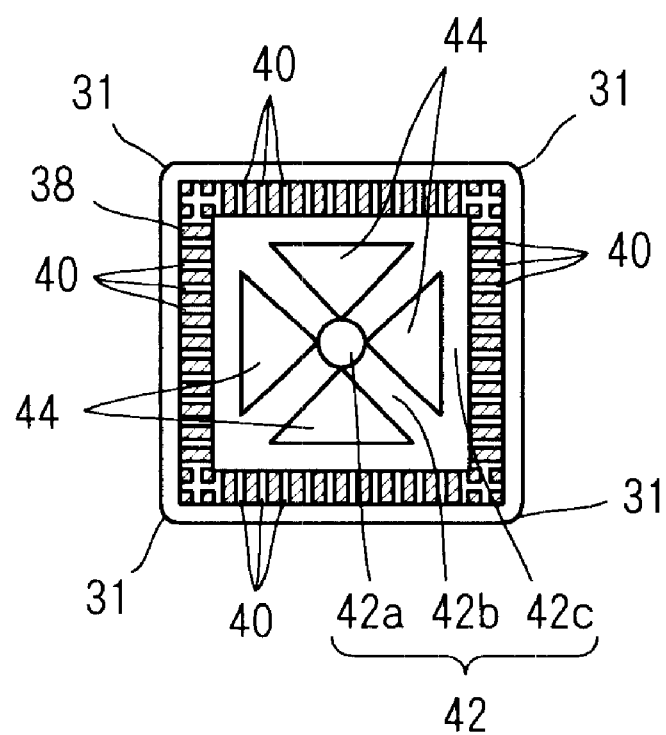
FIG. 4 is a sectional view showing a horizontal section of a ring portion of the lower punch.

The lower punch 18 has an inside formed with a lubricant supplying passage 42 communicated with each of the nozzles 40. As shown in FIG. 4, the lubricant supplying passage 42 includes a main passage 42a and sub-passages 42b, 42c.

The main passage 42a includes a generally L-shaped pipe starting from a lower end portion of a side surface of the lower punch main body 32, going inside the lower punch main body 32, making an upward turn at a center portion of the lower punch main body 32, and then going upward to the upper surface of the lower punch main body 32.

The sub-passages 42b, 42c are formed in the upper surface of the lower punch main body 32, so as to provide a horizontal connection between the main passage 42a and each of the nozzles 40. Specifically, the sub-passages 42b, 42c are formed by machining the upper surface of the lower punch main body 32 and inside the ring portion 38, leaving four triangular columns as guide members 44 on the upper surface of the lower punch main body 32. The sub-passage 42b is formed in an X-shape, extending from a center portion of the upper surface of the lower punch main body 32 toward each of the four angled portions 31. On the other hand, the sub-passage 42c is formed immediately inside the ring portion 38 as a generally rectangular loop.

The main passage 42a and the sub-passage 42b guide the lubricant from the supplying passage 42 coming from inside the lower punch 18 toward the nozzles 40 located near each of the angled portions 31. Specifically, the lubricant is first supplied to each of those nozzles 40 in an adjacency to the angled portion 31, and then is suppled to each of the other nozzles 40 via the sub-passage 42c.

A generally ring-shaped sealing member 46 is provided to encircle the side surface of the lower punch main body 32 at a portion immediately below each of the nozzles 40 for sealing a gap between the side surface of the lower punch 18 and the side surface of the through hole 12 of the die 14. The sealing member 46 is made, for example, of nitrile rubber or felt having a high sealing capability. Further, a generally ring-shaped absorbing member 48 is provided on the upper surface of the lower punch main body 32, surrounding the circumference of the ring portion 38 covering the nozzles 40. The absorbing member 48, is made of a fibrous material such as felt, and is therefore capable of holding by absorption part of the lubricant applied to the side surface of the through hole 12 of the die 14, keeping contact with the side surface of the through hole 12 while being in the through hole 12. Further, the absorbing member 48 allows the lubricant to pass from inside to the outside, and also functions as a filtering member during suction. With the above arrangement, the side surface of the lower punch 18 is provided with the sealing member 46 and the absorbing member 48.

The lid member 34, as part of the upper end portion of the lower punch 18, is attached on the ring portion 38 by silver-alloy brazing for example.

The main passage 42a of the lubricant supplying passage 42 has a lower end portion (a portion extending out of the lower end portion of the lower punch 18) connected, via a forked member 50, to a lubricant supplying pipe 52 and a suction pipe 54. (It should be noted here that FIGS. 1 and 5 respectively show the lubricant supplying pipe 52 and the suction pipe 54 in a vertical arrangement for clarity reasons, differing from FIGS. 2 and 3.) The lubricant supplying pipe 52 is connected to a pressurizing pump 56 for sending air to the lubricant supplying passage 42 whereas the suction pipe 54 is connected to a vacuum pump 58.

The supplying passage provided by the lubricant supplying pipe 52 is connected with a branching pipe 60. The branching pipe 60 is connected via a solenoid valve 62 to a tank 64 as a lubricant reservoir. The pressurizing pump 56 acts, as will be described later in more detail, when the die 14 is moved vertically before the powder 24 is filled in the cavity 22. While the pressurizing pump 56 is working, the solenoid valve 62 is opened, allowing the tank 64 to drip the lubricant into the lubricant supplying pipe 52. When the lubricant is dripped into the air pressurized (to about 0.7 MPa) by the pressurizing pump 56, the lubricant is atomized. The atomized lubricant is carried through the lubricant supplying passage 42, and supplied through the nozzles 40 to the side surface of the through hole 12.

It should be noted here that a solenoid valve 66 is provided in adjacency of the forked pipe 50 in the lubricant supplying pipe 52. The solenoid valve 66 is closed while the vacuum pump 58 is working.

On the other hand, the suction pipe 54 is provided with a solenoid valve 68 which is closed while the pressurizing pump 56 is working, and a filter 70 located closer to the vacuum pump 58 than is the solenoid valve 68 for preventing the vacuum pump 58 from sucking the powder 24 or the lubricant. The vacuum pump 58 is activated, as will be detailed later, when the cavity 22 is filled with the powder 24. When the vacuum pump 58 is activated (sucking at about −0.1 MPa), the cavity 22 is sucked under a reduced pressure through the absorbing member 48, the nozzles 40 and the lubricant supplying passage 42 each provided in the lower punch 18.

As described above, the nozzles 40 also act as suction ports opened in the side surface of the lower punch 18. Thus, it has become possible to provide a large number of suction ports generally uniformly around an upper portion of the side surface of the lower punch 18. Further, the lubricant supplying passage 42 also functions as a suction passage through the inside of the lower punch 18 to the suction ports. Further, the absorbing member 48 also functions as a filtering member covering the suction ports.

Figure 5:
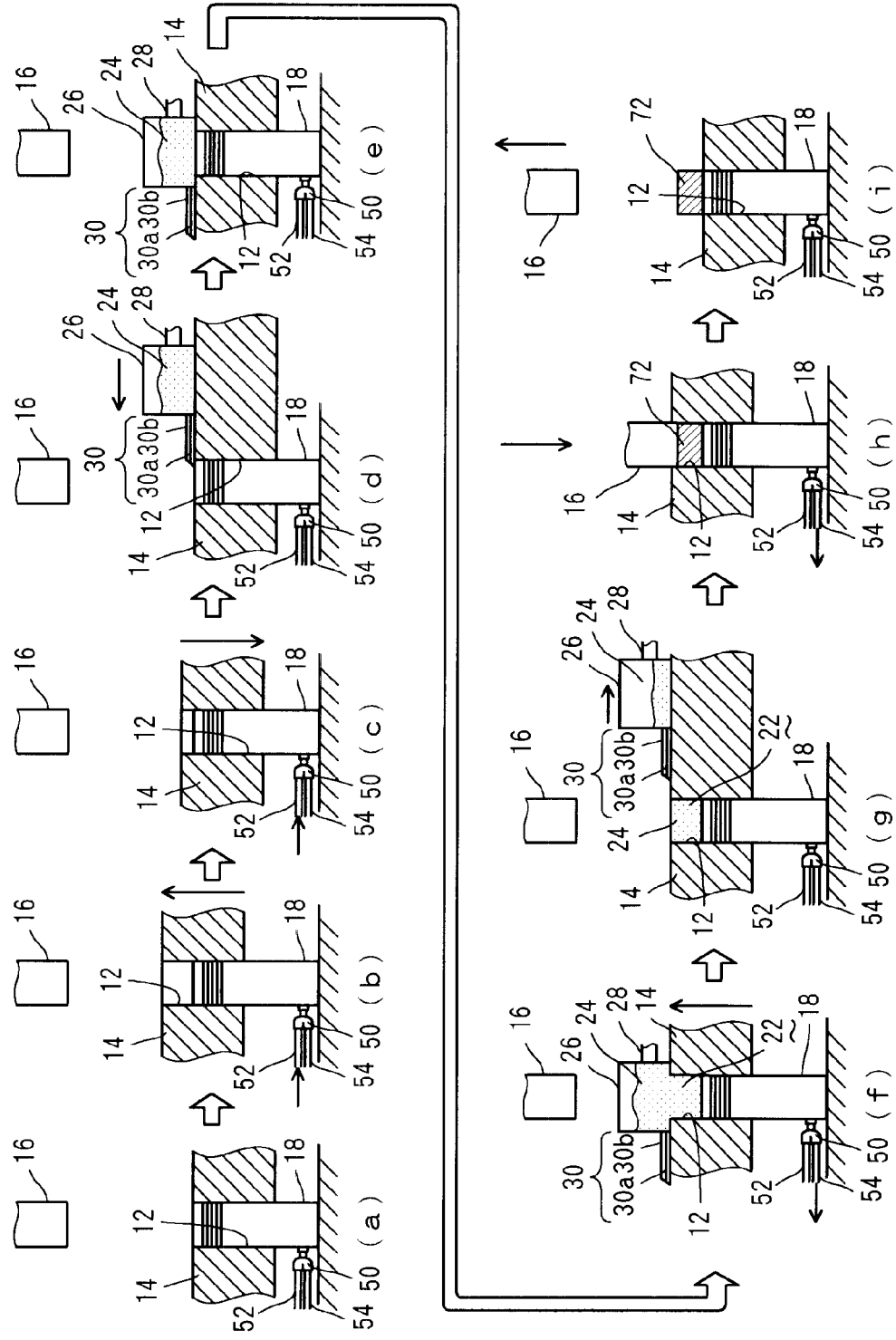
FIG. 5 is a diagram showing a sequence of operation of the rare-earth magnetic powder pressing apparatus.

With the above arrangements, operation of the rare-earth magnetic powder pressing apparatus 10 will then be described with reference to FIG. 5.

A first state shown in FIG. 5(a) is a state in which a previous cycle of the pressing operation is completed. The die 14 stays at an end of its downstroke while the upper punch 16 stays at an end of its upstroke.

When the die 14 begins rising (See FIG. 5(b)), the pressurizing pump 56 is activated, with the solenoid valves 62 and 66 opened. On the other hand, the vacuum pump 58 stays stopped, with the solenoid valve 68 staying closed. Under the above state, the lubricant is dripped from the tank 64 into the compressed. air in the lubricant supplying pipe 52, and is atomized in the air. The lubricant in an atomized state is supplied through the lubricant supplying passage 42 of the lower punch 18 to each of the nozzles 40. Each nozzle 40 sprays the lubricant to the side surface of the through hole 12 via the absorbing member 48.

During the above step, the sealing member 46 provided immediately below each of the nozzles 40 in the side surface of the lower punch 18 causes the lubricant and the air to be blasted upward, blowing upward to remove the powder 24 captured between the side surface of the lower punch 18 and the side surface of the through hole 12. This protects the side surface of the lower punch 18 and the side surface of the through hole 12 from being damaged by the powder 24. The protection is especially effective if the powder 24 is a highly abrasive rare-earth magnetic powder. In addition, the lubricant applied is prevented from falling down by the sealing member 46.

The lubricant supplying passage 42 constituted by the main supplying passage 42a and the sub-supplying passage 42b leads the way from inside the lower punch 18 to each of the nozzles 40 located near four angled portions 31. Therefore, the lubricant is reliably sprayed from the nozzles 40 located near each of the!four angled portions 31, making sure that each of the four corresponding corner portions of the through hole 12 is applied with the lubricant reliably.

Further, part of the lubricant sprayed from the nozzles 40 is absorbed by the absorbing member 48. When the die 14 is being moved, the absorbing member 48 spreads the absorbed lubricant and the lubricant already applied to the side surface of the through hole 12 for more uniform distribution, as well as soaking up excessive amount of the lubricant. As a result, it has become possible to apply the lubricant more uniformly while further saving the amount of lubricant applied.

Next, the die 14 begins to go down upon reaching an end of its upstroke. Again, while the die 14 is going down (See FIG. 5(c)), the lubricant is sprayed from the nozzles 40 for application to the side surface of the through hole 12 in the same manner as described above. It should be noted here however, that if the absorbing member 48 holds enough amount of the lubricant, it is not necessary to spray the lubricant during the downstroke of the die 14.

Next, when the die 14 reaches the end of the downstroke, the pressurizing pump 56 is deactivated and the solenoid valves 62 and 66 are closed. Then, as shown in FIG. 5(b), the feeder box 26 slides toward the through hole 12. At this time, the felt 30a of the wiper 30 wipes the powder 24 blown onto the upper surface of the die 14.

Then, when the feeder box 26 comes right above the through hole 12, the sliding movement is stopped (See FIG. 5(e)). Next, the die 14 begins rising to form the cavity 22. in an upper portion of the through hole 12, allowing the feeder box 26 to drop the powder 24 into the cavity 22 (See FIG. 5(f)).

On the other hand, generally at the same timing as the ascension of the die 14, the vacuum pump 58 is activated, and the solenoid valve 68 is opened, so that the cavity 22 is sucked under a decreased pressure through the nozzles 40, the lubricant supplying passage 42, and the absorbing member 48, by the vacuum pump 58.

During the above step, the sealing member 46 makes sure that a negative pressure necessary for the suction is reliably developed above the lower punch 18, increasing an effect of the sucking. Further, each of the nozzles 40 functioning as the suction port provided at the upper portion of the lower punch 18 can decrease clogging of the powder in a region between the side surface of the lower punch 18 and the side surface 12 of the through hole 12 of the die 14.

Further, the suction of the cavity 22 from each of the nozzles 40 provided in the lower punch 18 makes sure that the powder 24 is reliably filled in each of the corner portions formed by the side surface of the through hole 12 of the die 14 and the lower punch 18. Particularly, the suction of the cavity 22 provided from the nozzles 40 closest to the four angle portions 31 makes sure that the four corner portions of the through hole 12 respectively corresponding to the above four angle portions 31 are reliably filled with the powder 24. This advantage is especially significant if the powder 24 contains a rare-earth magnetic powder having a poor fluidity. As a result, it becomes possible to prevent non-uniform filling of the cavity 22 with the powder 24.

Further, the absorbing member 48 functioning also as a filtering member provides filtration so that the powder 24 does not enter inside the lower punch 18, i.e., into the lubricant supplying passage 42. This makes it possible to prevent clogging of the nozzles 40. Even if the powder 24 is sucked in, the filter 70 provided in the suction pipe 54 reliably prevents the powder 24 from coming into the vacuum pump 58. The filter 70 also prevents the lubricant from coming into the vacuum pump 58.

Next, when the die 14 has reached its end of the upstroke, the vacuum pump 58 is deactivated. The feeder box 26 is evacuated from above the cavity 22 (See FIG. 5(g)). During this evacuation movement, a bottom face of the feeder box 26 wipes the powder 24 off.

Then, as shown in FIG. 5(h), the upper punch 16 comes down into the through hole 12 (cavity 22), compressing the powder 24 within the cavity 22 with the lower punch 18 at a pressure of about 100 MPa to form a compact 72. During this formation step, the vacuum pump 58 is activated again for sucking gases such as air (deaeration) held in a body of powder 24.

Next, upon. completion of the press forming, the vacuum pump 58 is deactivated and the solenoid valve 68 is closed. Then, the upper punch 16 is raised whereas the die 14 is lowered for taking out the compact 72 (See FIG. 5(i)). Since the entire side surface of the through hole 12 is applied with a uniform coating of the lubricant, the compact 72 can be taken out smoothly and reliably.

For example, according to an experiment, a total of 50 cycles of press formation of the powder 24 was performed and a total of 50 compacts 72 were obtained, of which none was found unfilled in any corner portion 31, cracked or flaked.

Further, the lubricant can be applied uniformly by using even a relatively small amount of the lubricant, practically eliminating formation of a pool of lubricant otherwise expected in the recess 36 in the upper surface of the lower punch 18. As a result, the powder 24 is easily compacted by the pressurization, yielding the compact 72 of the desired characteristics. Especially, if the recess 36 is mirror polished and even if formed to have a curved surface, the powder 24 can move in the recess 36 under the pressure into the desire form of the compact 72. Further, it becomes possible to prevent the compact 72 from being coated with an unnecessarily large amount of lubricant. As a result, when the compact 72 is sintered, there will not be excess carbon, and therefore there will not be deterioration in the magnetic characteristics of the rare-earth magnet. Still further, life of the metal molds such as the die 145, the upper punch 16, the lower punch 18 can be increased.

Further, prevention of non-uniform filling of the powder 24 in the cavity 22 makes it possible to form the compact 72 of a good quality even if the powder 24 is made of a rare-earth magnetic powder having a low fluidity.

As a result, according to the above embodiment, it becomes possible to improve productivity through improved quality and yield of the compact 72 by the spray of atomized lubricant from each of the nozzles 40 in the side surface of the lower punch 18, and the suction of the cavity 22 under the reduced pressure through each of the nozzles 40 while the cavity 22 is filled with the powder 24.

For example, the powder 24 may be manufactured by the following strip casting process. Specifically, as shown in U.S. Pat. No. 5,383,978, an alloy having a composition comprising 21Nd-1B-68Fe (% by weight) is melted by a high-frequency melting process in an argon (Ar) gas atmosphere into a molten material. The molten material is maintained at 1,350° C., and then thermally quenched on a single roll. Cooling conditions at this time include a roll peripheral speed of about 1 m/s, a cooling rate of 500° C./s, and a sub-cooling of 200° C. The above quenching-solidification process yields a body of flaky alloy having a thickness of about 0.3 mm.

It should be noted here that a portion of iron (Fe) in the above composition may be replaced by cobalt (Co). Further, another composition such as disclosed in U.S. Pat. No. 4,770,723 by the present applicant may also be used.

The obtained flaky alloy is allowed to absorb hydrogen for embrittlement, and then coarsely pulverized by a feather mill into flaky grains of about 5 mm. The coarsely pulverized alloy prepared by the above process is then ground by a jet mill into alloy powder having an average particle size of 3.5 µm. The alloy powder is then added and mixed with a 2.0 (% by weight) of a lubricant prepared by diluting fatty acid ester with a petroleum solvent to obtain the powder 24.

The powder 24 thus prepared is then oriented in a magnetic field of 1.6 T, pressed under a pressure of 147 MPa into a compact 10 mm wide, 10 mm high, and 20 mm long. The compact is sintered for one hour at 1050° C. in an argon (Ar) gas atmosphere, aged for an hour at 600° C. in an argon (Ar) gas atmosphere to obtain a sintered magnet. The magnet has magnetic characteristics including, a coercive force of 1074 kA/m, residual flux density of 1.39 T, and a maximum energy product of 375 kJ/m$^3$.

The lubricant is a solvent dilution of a fatty acid ester. Specifically, the fatty acid ester may be capronic acid methyl, capric acid methyl, lauric acid methyl, lauryl acid methyl and so on.

The solvent may be a petroleum solvent represented by isoparaffin, or a naphthene solvent and so on. The fatty acid ester is mixed with the solvent at a weight ratio of 1:20 through 1:1. Inclusion of arachidic acid as a fatty acid up to 1.0 (% by weight) is acceptable.

According to the present invention, it is possible to prevent non-uniform filling of the powder 24 and reduce adverse effects from carbon even if the powder 24 is manufactured by the above strip casting process, making it possible to obtain a magnet having superb magnetic characteristics.

It should be noted here that according to the above embodiment, the nozzles 40, the lubricant supplying passage 42 and the absorbing member 48 function also as the suction ports, the suction passage and the filtering member respectively. However, each of these functions may be performed by a separate component. In such a case, the absorbing member 48 may be provided at another location away from the nozzles 40.

Further, according to the above embodiment, deaeration is performed while the powder 24 in the cavity 22 is under compression. However, this deaeration is not necessarily performed.

Still further, it is not necessary to use both methods of the lubricant, applying operation and the sucking operation during the powder filling according to the present invention. It is still possible to improve productivity through improvement in the quality and the yield of the compact 72 by only using either one of the methods.

Figure 6:
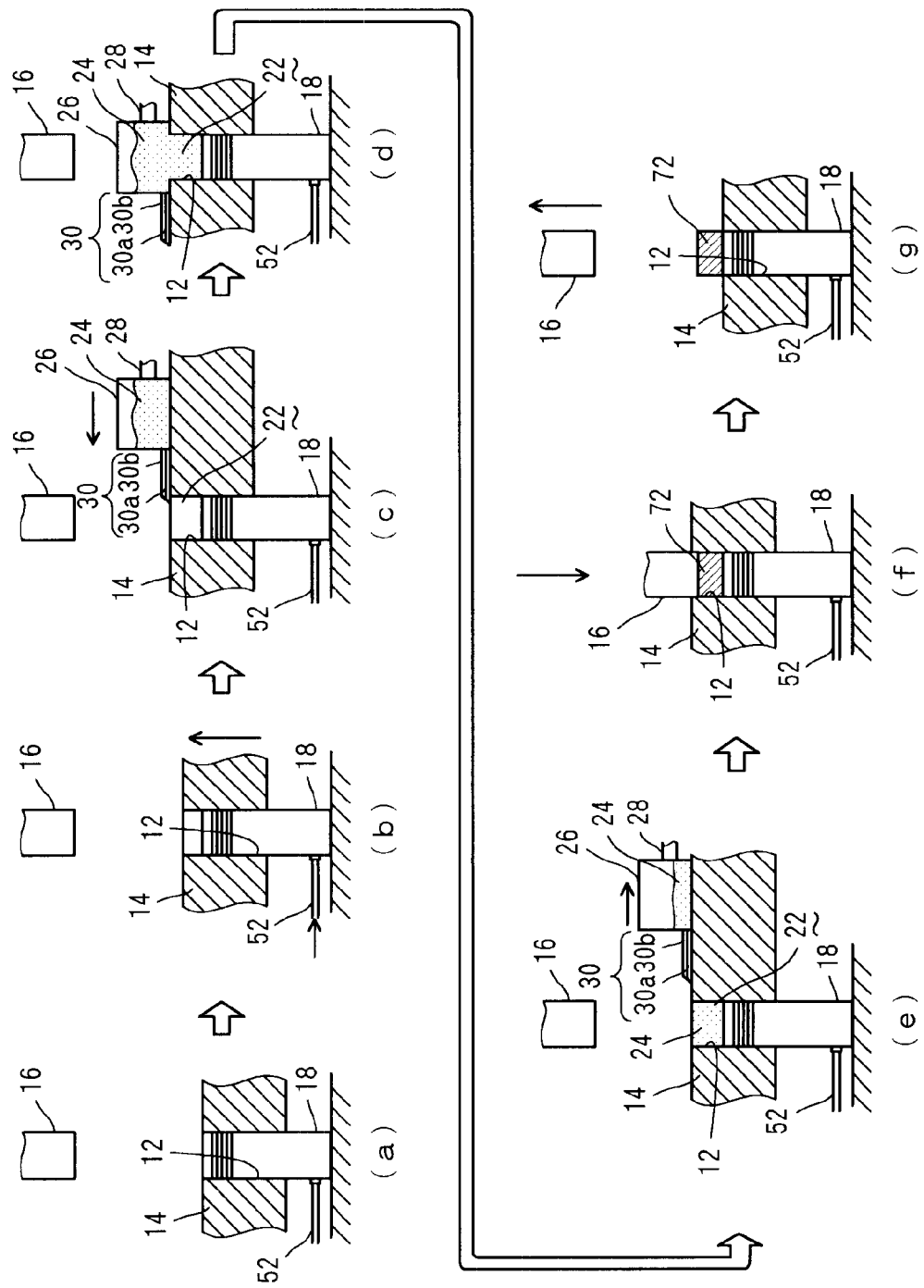
FIG. 6 is a diagram showing a sequence of operation of the rare-earth magnetic powder pressing apparatus if suction is not provided while the powder is being filled.

If only the lubricant application method is used (without performing the suction during the powder filling,) only the lubricant supplying pipe 52 may be connected to the lower end portion of the main supplying passage 42a of the lubricant supplying passage 42, without the forked member 50. In such a case, the pressing apparatus is operated as follows for example: Specifically, as shown in FIG. 6, starting from the situation immediately after completion of the previous pressing cycle (See FIG. 6(a)), the die 14 is raised (See FIG. 6(b)). While the die 14 is rising, the lubricant is sprayed from each of the nozzles 40 to the side surface of the through hole 12, just in the same way as in the above embodiment. When the die 14 has reached the end of upstroke, the die 14 is not lowered, and the feeder box 26 is slid toward the through hole 12 (See FIG. 6(c)). It should be noted that when the die 14 has reached the end of upstroke, the cavity 22 has already been formed in the through hole 12. Next, the sliding operation is stopped when the feeder box 26 has come right above the through hole 12, allowing the powder 24 in the feeder box 26 to fall into the cavity 22 (See FIG. 6(d)). Then, the feeder box 26 is evacuated from above the cavity 22 (See FIG. 6(e)), allowing the upper punch 16 to come down, so that the upper punch 16 and the lower punch 18 can compress the powder 24 in the cavity 22 (See FIG. 6(f)). Finally, the upper punch 16 is raised while the die 14 is lowered so that the compact 72 can be taken out (See FIG. 6(g)). According to this method therefore, a cycle speed can be increased than that of the above embodiment.

Figure 7:
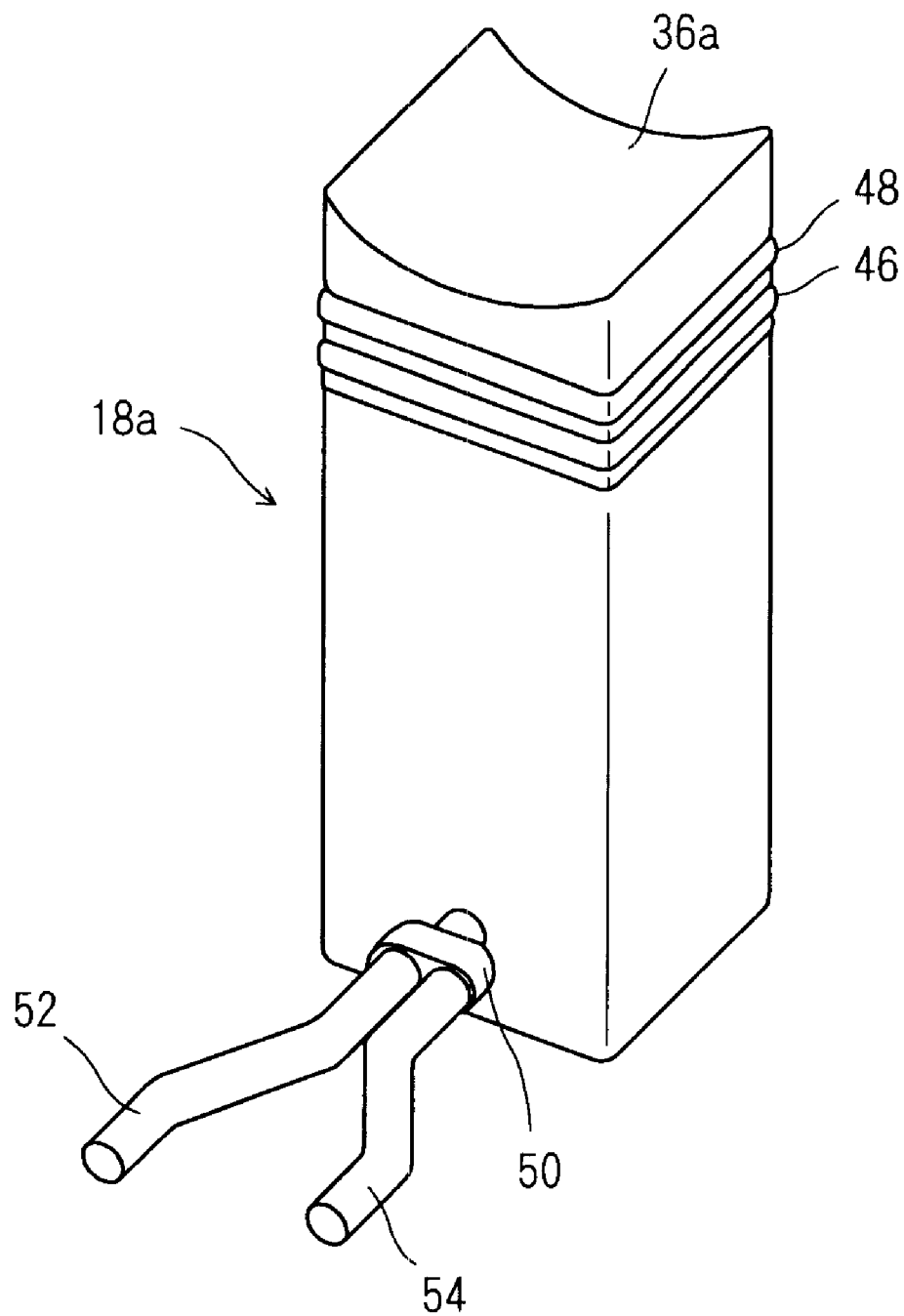
FIG. 7 is a perspective view showing a variation of the lower punch.

In addition, according to the above embodiment, the lower punch 18 has a rectangular section. However, the section may be another polyangular shape or may be circular for application of the present invention. Still further, the lubricant is more likely to pool on a lower punch 18a having a deep recess 36a as shown in FIG. 7. However, the pooling of the lubricant can be practically eliminated by the method of lubricant application according to the present invention, making possible to further increase the advantages.

Further, according to the above embodiment, the lower punch 18 is fixed and the die 14 is vertically movable. However, the present invention is not limited by this arrangement. For example, the die 14 may be fixed whereas the lower punch 18 is vertically movable.

Further, the lubricant supplying means including the nozzles and the lubricant supplying passage and so on may be provided by using the upper punch 16. In such a case, the sealing member should seal a side surface of the upper punch 16 immediately above the nozzles, so that the lubricant is reliably discharged downward and the applied lubricant is prevented from leaking to the upper surface of the die for example, from a gap between the upper punch and the side surface of the through hole.

Further, the sealing member 46 may be formed integrally with the lower punch 18. The lubricant may be supplied in a form other than the atomized state as long as being supplied with a gas.

Further, the present invention is also applicable to pressing of powders other than the rare-earth magnetic powder such as dry pressing of a ferrite powder.

Still further, if the cavity 22 is shallow, the stroke movement of the die 14 may be stopped when the lubricant is supplied with the gas from the nozzles 40 to the side surface of the through hole 12 within the through hole 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power pressing apparatus for formation of a compact by pressing a power, comprising:
   a die having a vertical through hole;
   a first punch and a second punch, each being vertically moveable within the through hole relative to the die, for compression of the power within a cavity formed in the through hole; and
   a supplying means including a supply port provided in a side surface of the first punch, for supply of a lubricant with a gas from the supply port to the side surface of the through hole within the through hole, wherein
   the first punch is formed to have a polyangular section so as to have a plurality of angled portions;

the supply port being directed to the respective angled portions of the first punch; and the supplying means further including a lubricant supplying passage connected with the supply port through the first punch for supply of the lubricant to the supply port.

2. The apparatus according to claim 1, further comprising an absorbing member provided in the side surface of the first punch for holding by absorption the lubricant applied to the side surface of the through hole and for contact to the side surface of the through hole within the through hole.

3. The apparatus according to claim 1, further comprising a sealing portion provided between the side surface of the first punch and the die through hole farther away from the cavity than is the supply port for sealing a gap between the side surface of the first punch and the side surface of the through hole.

4. The apparatus according to any one of claims 1, 2 or 3, wherein the first punch is a lower punch.

5. The apparatus according to claim 4, wherein the lower punch has an upper surface formed into a recess.

6. The apparatus according to any one of claims 1, 2 or 3, wherein the power includes a rare-earth magnetic powder.

7. The apparatus according to any of claims 1, 2 or 3, wherein one of the first punch and the second punch is a lower punch; and the apparatus further comprising a sucking means having a suction port provided in the side surface of the lower punch, and means connected with the suction port for providing suction from the cavity under a reduced pressure from the suction port while the cavity is being filled with the powder.

8. A powder pressing apparatus for formation of a compact by pressing a powder, comprising:

a die having a vertical through hole;

an upper punch and a lower punch, each being vertically movable within the through hole relative to the die, for compression of the power within a cavity formed in the through hole; and a sucking means including a suction port provided in a side surface of the lower punch, for providing suction from the cavity under a reduced pressure from the suction port while the cavity is being filled with the powder; wherein:

the lower punch is formed to have a polyangular section so as to have a plurality of angled portions;

the suction port being formed near the respective angled portions of the lower punch; and the sucking means further including a sucking passage connected with the suction port, through the lower punch.

9. The apparatus according to claim 8, further comprising a filtering member provided in the side surface of the lower punch for covering the suction port.

10. The apparatus according to claim 8, further comprising a sealing portion provided in the side surface of the lower punch below the suction port for sealing a gap between the side surface of the lower punch and a side surface of the through hole.

11. The apparatus according to any one of claims 8, 9, or 10, wherein the powder includes a rare-earth magnetic powder.

12. A method of pressing a powder for formation of a compact through compression of the powder by a first punch and a second punch within a cavity formed in a vertical through hole of a die, comprising:

a lubricant supplying step of supplying a lubricant with a gas from a side surface of the first punch to a side surface of the through hole within the through hole;

a powder filling step of filling the cavity with the powder; and a press forming step of forming the compact by pressing the powder filled in the cavity by the first punch and the second punch, wherein the first punch is formed to have a polyangular section so as to have a plurality of angled portions; and the lubricant being supplied from inside the first punch from near the respective angled portions to the side surface of the through hole in the lubricant supplying step.

13. The method according to claim 12, further comprising a step of wiping the lubricant applied to the side surface of the through hole.

14. The method according to claim 12, wherein:

a gap between the side surface of the first punch and the side surface of the through hole is sealed while the lubricant is supplied to the side surface of the through hole in the lubricant supplying step.

15. The method according to any one of claims 12, 13 or 14, wherein the first punch is a lower punch.

16. The method according to claim 15, wherein the lower punch has an upper surface formed into a recess.

17. The method according to any one of claims 12, 13 or 14, wherein the powder includes a rare-earth magnetic powder.

18. The method according to any one of claims 12, 13 or 14, wherein:

one of the first punch and the second punch is a lower punch; and the cavity being under suction by a reduced pressure provided from the side surface of the lower punch while the powder is being filled into the cavity in the powder filling step.

19. A method of pressing a powder for formation of a compact through compression of the powder by an upper punch and a lower punch within a cavity formed in a vertical through hole of a die, comprising:

a powder filling step of filling the cavity with the power while the cavity is under suction by a reduced pressure provided from a side surface of the lower punch; and a press forming step of forming the compact by pressing the power filled in the cavity by the upper punch and the lower punch, wherein the lower punch is formed to have a polyangular portion so as to have a plurality of angled portions; and the cavity being under suction by a reduced pressure provided from near the respective angled portions in the powder filling step.

20. The method according to claim 19, wherein filtration is provided during the suction from the cavity by the reduced pressure for preventing the lower punch from sucking the powder in the powder filling step.

21. The method according to claim 19, wherein a gap between the side surface of the lower punch and a side surface of the through hole is sealed while the cavity is under the suction by the reduced pressure in the powder filling step.

22. The method according to any one of claims 19, 20 or 21, wherein the powder includes a rare-earth magnetic powder.

23. The method according to claim 22, wherein the rare-earth magnetic powder is manufactured by a strip casting process.

* * * * *